Nov. 7, 1944.  J. LEDWINKA ET AL  2,362,077
VEHICLE CONSTRUCTION AND METHOD OF ASSEMBLING SAME
Original Filed April 20, 1936  4 Sheets-Sheet 1
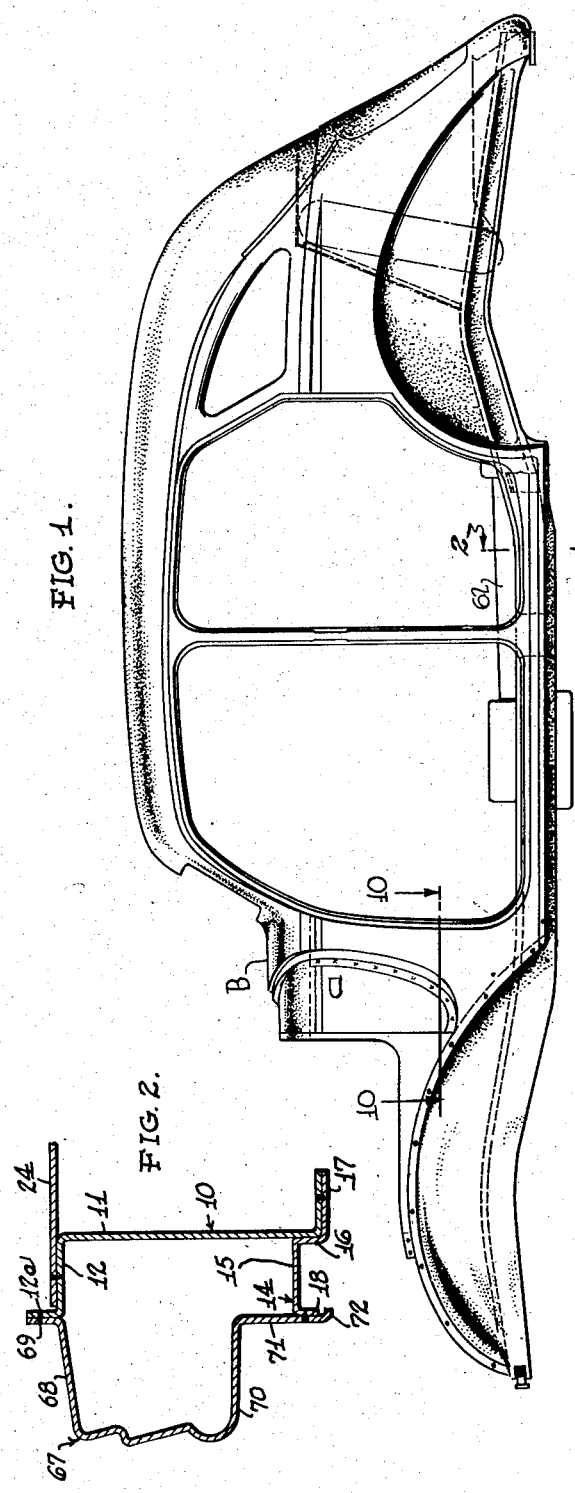
INVENTORS
Joseph Ledwinka
George Trautvetter
John W. Kelly
BY John P. Tarbox
ATTORNEY

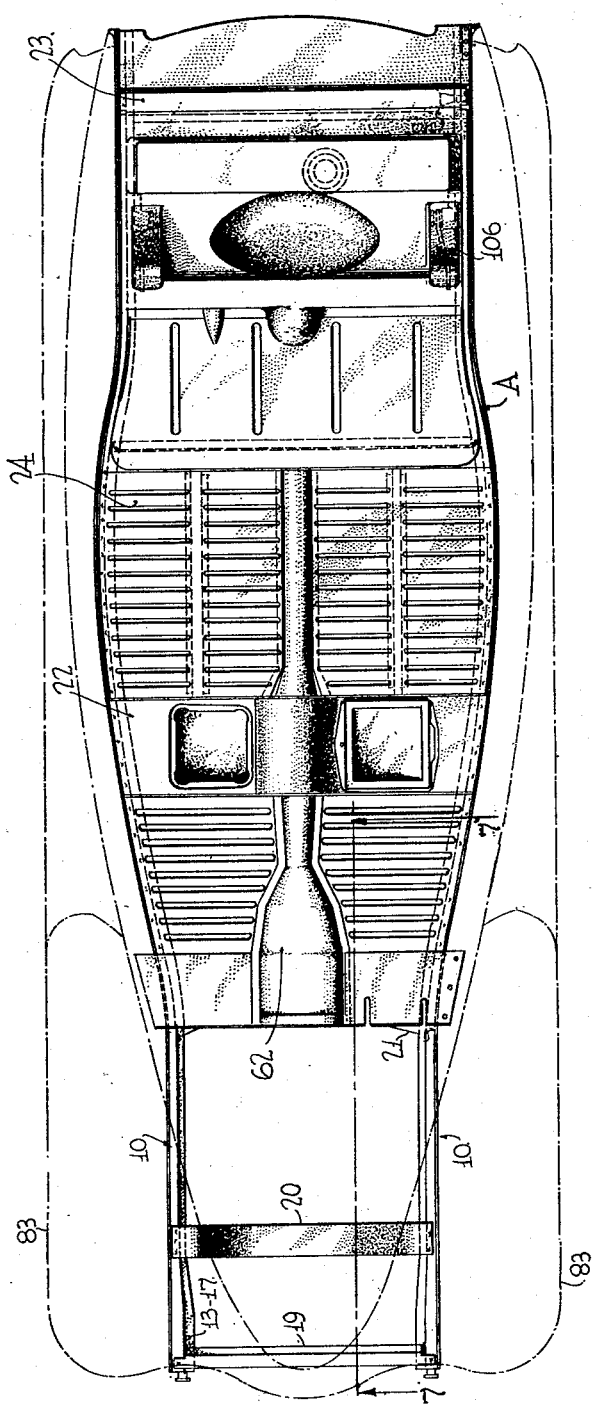
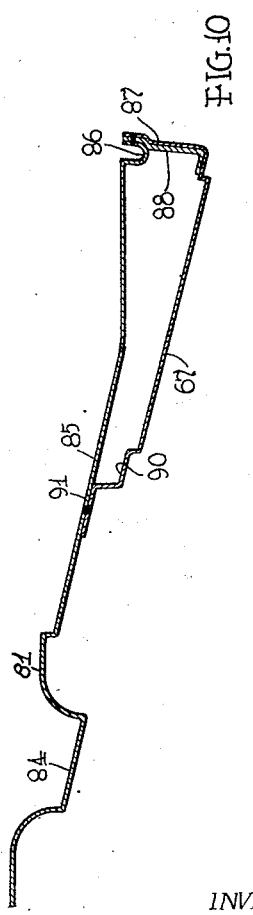

Nov. 7, 1944.  J. LEDWINKA ET AL  2,362,077
VEHICLE CONSTRUCTION AND METHOD OF ASSEMBLING SAME
Original Filed April 20, 1936  4 Sheets-Sheet 3
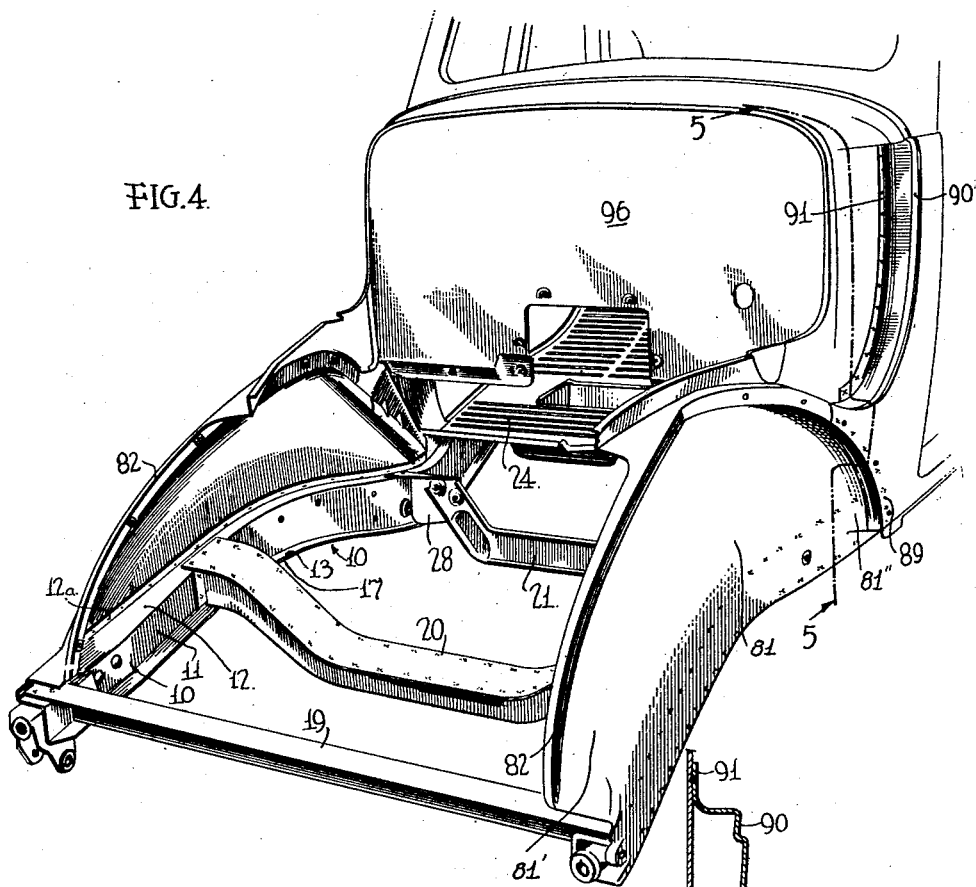
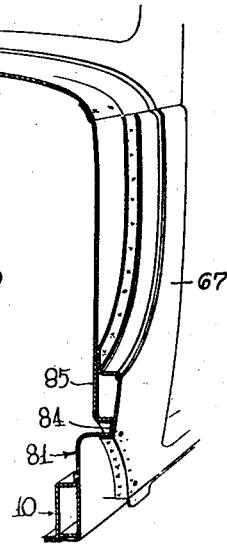
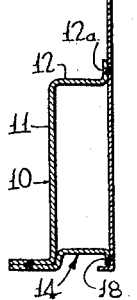
INVENTORS:
Joseph Ledwinka
George Trautvetter
John W. Kelly
BY John P. Tarbox
ATTORNEY Nov. 7, 1944.　　J. LEDWINKA ET AL　　2,362,077
VEHICLE CONSTRUCTION AND METHOD OF ASSEMBLING SAME
Original Filed April 20, 1936　　4 Sheets-Sheet 4
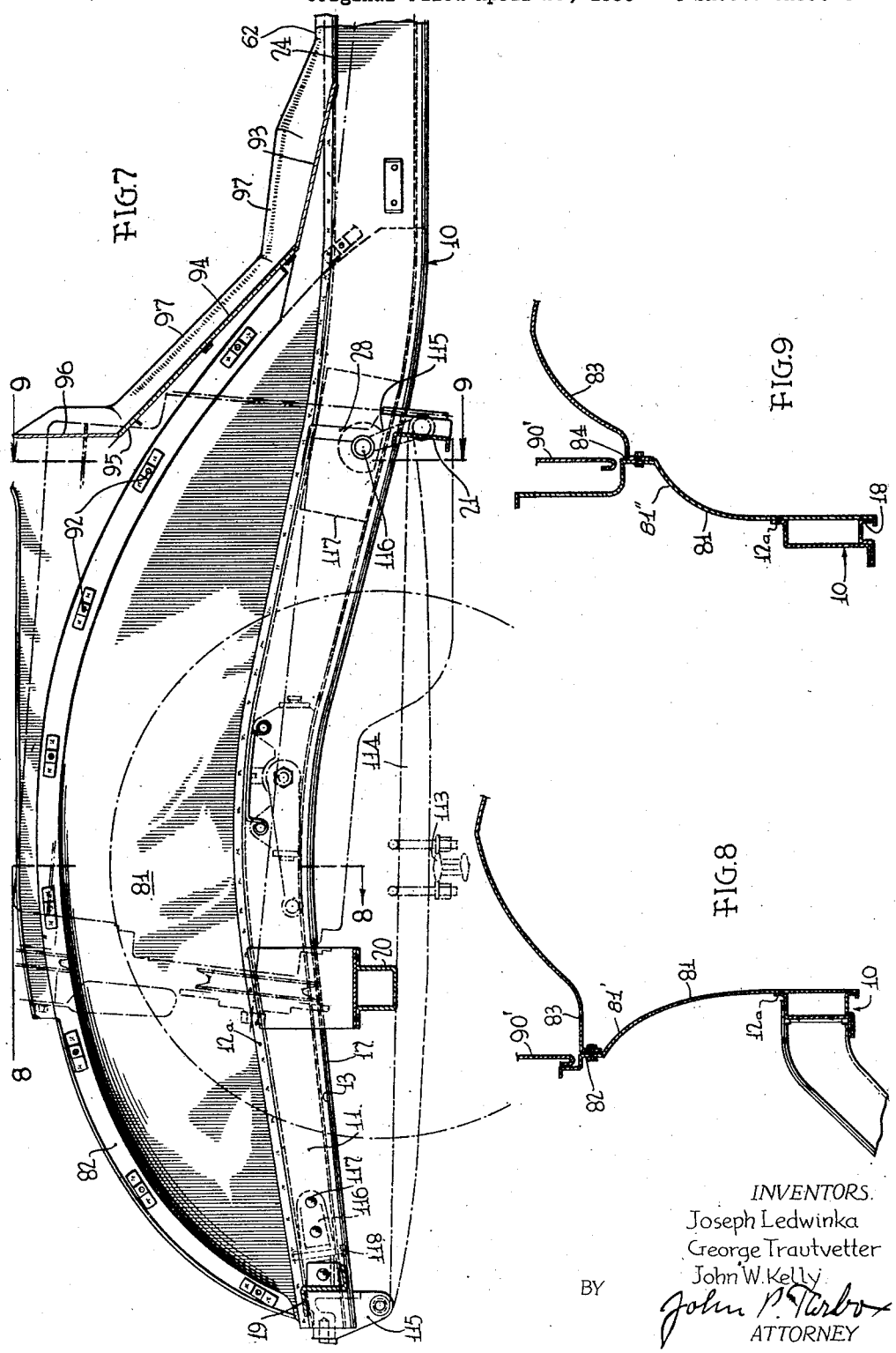
INVENTORS.
Joseph Ledwinka
George Trautvetter
John W. Kelly
BY
John P. Tarbox
ATTORNEY Patented Nov. 7, 1944

2,362,077

UNITED STATES PATENT OFFICE 2,362,077

VEHICLE CONSTRUCTION AND METHOD OF ASSEMBLING SAME

Joseph Ledwinka, George Trautvetter, and John W. Kelly, Philadelphia, Pa., assignor to Edward G. Budd Manufacturing Company, Philadelphia, Pa., a corporation of Pennsylvania Original application April 20, 1936, Serial No. 75,374. Divided and this application February 20, 1941, Serial No. 379,762

5 Claims. (Cl. 296—28)

The invention relates to a vehicle body such as a combined body and chassis structure, and particularly to the construction of an automobile body in the wheel housing regions.

It is the prime object of the invention to simplify such structures without corresponding reduction in strength or sacrificing good appearance.

It is a further object to so fabricate the parts entering into the combined body and chassis structure as to permit their being readily subassembled in units well adapted for shipment and formed with final assembly joint formations well adapted to be brought together for final assembly for joinder together by simple operations.

The above and other objects of the invention as well as the particular manner in which they are attained will become more apparent from the following detailed description when read in connection with the accompanying drawings forming a part of this specification:

In the drawings,

Fig. 1 shows in side elevation a combined body and chassis construction according to the invention.

Fig. 2 shows an enlarged detail sectional view along line 2—2 of Fig. 1.

Fig. 3 shows in a plan view the underframe sub-assembly and, in dot and dash lines the outline of the body superstructure in association therewith.

Fig. 4 is a fragmentary front view in perspective showing the assembly as seen from the front and side.

Fig. 5 is a perspective view similar to Fig. 4 of this front portion with parts shown in section along the side of the cowl and in the front wheel housing region substantially along the line 5—5 of Fig. 4, and Fig. 6 shows a transverse section on the line 5—5 of Fig. 4 on an enlarged scale.

Fig. 7 is a fragmentary longitudinal central section of the lower portion of the front end showing the far side of the side wall in side elevation, and Figs. 8 and 9 are detail sectional views taken approximately on the lines 8—8 and 9—9 of Fig. 7 and looking in the direction of the arrows at the end of those lines. These figures show the inner portions of the fenders bolted in place on the lower outside edge of the hood.

Fig. 10 is a horizontal longitudinal section taken approximately along the line 10—10 of Fig. 1 showing the construction at the side of the cowl and forwardly thereof.

In the drawings there is shown a preferred form of the invention as applied to a sedan type of body. The combined body and chassis underframe sub-assembly is designated generally by the letter A and the body superstructure includes the side wall subassemblies designated generally by the letter B. The entire structure is preferably fabricated out of light gauge metal, although the main longitudinal side members of the underframe may, if desired, be of slightly heavier gauge than the body superstructure paneling and the underframe flooring.

The main longitudinal side members of the underframe comprise longitudinal side sills 10 extending from end to end of the structure and conforming in plan generally to the outer contour of the lower side portions of the body superstructure and formed at front and rear with the usual kick-up portions to afford room for the vertical displacement of the axles relative thereto.

As shown most clearly in Figs. 2 and 6, these sill members 10 are of generally outwardly presenting hollow section, and, in particular, of substantially Z-cross section comprising a deep vertical web 11, an upper outwardly extending arm 12 and a lower inwardly extending arm 13. To provide a convenient final assembly joint and to further stiffen the structure the upper outwardly extending arm 12 is formed with an upwardly extending marginal flange 12a. For convenience in the final assembly and to afford additional stiffness and strength to the side sill members 10 they are reinforced in their lower portions by a generally downwardly presenting channel member 14 extending substantially throughout the length of the sills. The bottom wall 15 of channel member 14 is of a width corresponding to the width of the upper arm 12 of the sill member 10, and the inner side wall 16 of the channel 14 is formed with an inwardly extending flange 17 of substantially the width of the lower arm 13 of the sill member 10, the angle formed by the side wall 16 and the flange 17 being adapted to nest with the angle formed by the web 11 and flange 13 and to be secured to the member 10 by a line of spot welds joining the flanges 13 and 17 as indicated in the drawings. Thus a double thickness construction is provided along the lower margin of the web 11 which adds materially to the strength of the structure and forms a strong ledge for supporting and securing the cross members of the underframe. The outer side wall 18 of the channel 14 forms a downwardly extending flange similar to the upwardly extending flange 12a on the sill member 10.

The underframe A is transversely stiffened against torsional and other stresses by a number of transverse cross members designated (see Figs. 3, 4 and 7) by numerals 19, 20, 21, 22 and 23 and the body floor paneling designated generally by the reference numeral 24 interconnecting these cross members and the side sills and extending from the region of the cowl to the region of the rear end of the frame. The principal cross members 20, 21, 22 and 23 are preferably of box or deep channel form and strongly secured to the side sills to resist torsional and other stresses.

By the construction described a very light combined body and chassis underframe is attained without sacrifice of necessary strength. This underframe is sufficiently rigid, without the addition of the superstructure, to be handled and shipped as a unit and to have all the chassis accessories including the running gear, the spring suspension and the transmission and other parts usually associated with the chassis assembled therewith prior to its final assembly with the body superstructure which gives to the underframe the additional strength required to serve as the combined body and chassis structure.

The underframe hereinbefore described, while sufficiently strong to mount all the chassis parts while sub-assembling it on the usual chassis line is in itself insufficiently strong to carry the load of the combined body and chassis construction. According to the invention the body superstructure is utilized to add very materially to the strength of the underframe structure and to form at the same time upwardly extending side walls which reinforce the underframe structure very materially. The body superstructure may conveniently be assembled in separate sub-assemblies including side sub-assemblies B extending from end to end of the body comprising outer paneling extended inwardly around the doorway and window openings to frame said openings and inner reinforcements wherever such reinforcements are desired. The outer paneling of the side sub-assemblies also includes front and rear wheel housings, the front wheel housing portion extending forwardly of the cowl and may conveniently be utilized to reinforce the outer cowl side paneling. The body shell may be dropped down as a unit over the sides of the underframe and secured thereto so as to close the outwardly open hollow sills of the chassis of the underframe from end to end and form therewith box section structures.

By referring to Figs. 2, 5, 8 and 9, it will be readily apparent how the body side paneling is formed in its lower margin to fit against and close the box section of the side sills extending from end to end of the combined structure. The outer body contouring paneling designated generally by the numeral 67 is generally in the form of an inwardly presenting channel having its upper side wall 68 inwardly extending to form the thresholds of the doors and provided in its inner margin with an upwardly extending flange 69 adapted in final assembly to overlap the upwardly extending flange 12a of the side sill member 10 and secured thereto readily in final assembly by a line of spot welds. At the bottom the paneling is extended inwardly at 70 and formed at its inner margin with a downwardly extending flange 71 which overlaps the outer side wall flange 18 of the channel member 14 and is secured thereto by another line of spot welds. The extreme lower margin of the side panels 67 is slightly turned inwardly at 72 to stiffen the margin and to avoid a raw edge. This small inwardly turned flange 72 does not interfere with the bringing of the preassembled body side and roof superstructure in position because it readily springs outwardly the slight extent required to allow the entire superstructure, as shown in Fig. 26 to be brought down over the outer side of the underframe sub-assembly with top and bottom flanges 69 and 71 overlapping flanges 12a and 18, respectively, of the underframe sub-assembly side sills.

With the parts so joined together it will be seen that a deep and wide substantial box section structure is provided through the threshold portions strongly reinforcing the underframe in this region, even though the sheet metal parts entering into the box section are of relatively light gauge.

In the rear wheel housing region, the wheel housing paneling overlaps the top and bottom flanges 12a and 18 of the side sill and is secured thereto by spot welding.

From the A-post forwardly (see Figs. 1, 4, 5, 6, 8, 9 and 10), the wheel housing portion of the side sub-assembly is formed by a paneling or stamping 81 which in its lower skirt portion overlaps the upwardly and downwardly extending flanges 12a and 18 of the underframe and is spot welded thereto to form a box section, see Figs. 8 and 9. This wheel housing stamping or panel 81 extends at 81' upwardly and inwardly at its forward end to a vertical marginal flange 82 (see Fig. 8) extending along a curved line forming the attachment zone for the fender 83. In its rear portion, see Figs. 5, 6, 9 and 10, the wheel housing portion of the stamping is inclined upwardly and outwardly at 81'' as appears clearly in Figs. 9 and 5, so as to form part of the crown, and is formed with an inwardly facing channel portion 84 (see Figs. 5, 6 and 10), the bottom or outer wall of the channel being curved and containing the curved attachment zone for the fender rearwardly in continuation of the forward curved attaching flange 82. The rear wall of this channel portion 84 is extended rearwardly and upwardly to form the inner paneling 85 of the cowl side. As is clearly shown in Fig. 10, this inner paneling of the cowl side 85 is extended rearwardly to the A-post where it is formed with a marginal inwardly facing channel 86 forming an upholstery attaching strip receiving channel and also affording access to permit welding of the panel 85 to the inwardly extending jamb face portion of the A-post 87 formed by the outer paneling and the A-post reinforcing stamping 88. The outer paneling of the cowl side may be formed as a one-piece stamping with the outer side paneling 67 rearwardly thereof and is secured in its forward margin where it is offset inwardly at 90 to form a seat for the rear edge of the hood, the side edge of which is shown at 90', Figs. 8 and 9, and further offset in its extreme margin at 91 to seat against the inner panel 85 and be secured thereto by spot welding, this joint at 91 being a line of spot welds extending in a curve from the lower forward portion of the cowl upwardly to a point adjacent the top of the cowl as appears clearly in Figs. 4 and 5. The lower portion of the outer panel 67 of the cowl overlaps at 89 the outer bottom wall and forward side wall of the curved channel 84 formed at the rear margin of the wheel housing as shown in Figs. 4, 5 and 6 and is secured thereto by a double line of spot welds as clearly shown in Fig. 6. Thus the cowl side is constituted a strong double walled box section upward extension of the box section forming the side sill structure, this construction contributing very materially to the strength of the combined structure in this region. In Fig. 7, which shows the inner or wheel housing panel 81 from the inside, the curved line along which the fender is attached is clearly indicated by the curved row of tapping blocks 92 spot welded to the inner wall of the panel and screw threaded to receive the bolts which secure the fender in place. After the fenders are secured in place in this way they additionally stiffen and strengthen the front end construction.

Finally, the inclined front body flooring members 93 and 94 appearing in Fig. 7 are secured in place between the front end of the main body flooring 24 pre-assembled with the underframe, the uppermost inclined portion of the flooring 94 being secured to a rearwardly and downwardly inclined flange 95 of the shroud pan 96 extending between the sides and top wall of the cowl. To provide room for the transmission housing these inclined forward portions of the flooring 93 and 94 are shown provided with central upward bulges 97 in line with the bulge or tunnel 62 for housing the propeller shaft in the floor rearwardly thereof.

The combined body and chassis is suspended from the front axle 113 through the spring 114 supported at the front end by a bracket forming part of a fitting 115 which has an arm telescoped within the hollow section of the sill as indicated in dotted lines at 116 and secured to the sill by the rivets 117 and bolts 118. This fitting also provides the means for securing the front bumpers not shown. Similarly the rear ends of the sills may be provided with fittings for securing the rear bumpers. At the rear the spring 114 is suspended through a suspension link 115 from a bolt indicated at 116 extending through the hollow box section sill, the sill in this region being reinforced by a suitable inner reinforce indicated in dotted lines at 117'.

It will be seen from the foregoing that while there has been described one specific embodiment of the invention, other modifications are possible and without departing from the spirit of the invention as expressed in the claims appended hereto and such modifications are intended to be included within their scope.

The present application is a division of the prior application Vehicle construction and method of assembling same, Serial No. 75,374, filed April 20, 1936, now Pat. No. 2,268,291, dated December 30, 1941, in the names of Joseph Ledwinka, George Trautvetter and John W. Kelly.

What we claim is:

1. In a vehicle body, in combination: a wheel housing; a first panel forming at least part of the skirt and the crown of said wheel housing; a second panel; said first panel having an integral portion which extends, when viewed from the interior of the wheel housing outwardly beyond the confines of the wheel housing proper for a distance at least several times greater than the width of a mere connecting flange; said first panel and its extension supporting and being covered by said second panel constituting part of the outer body surface; and means for removably securing said second panel to said first panel in a region spaced from the confines of the wheel housing proper.

2. In a vehicle body; a wheel housing and a fender, the latter to be placed outside of the former; a panel forming the skirt and, at least partly, the crown of said wheel housing; said panel having a portion which extends outwardly beyond the confines of the wheel housing proper and exceeds in width the width of a mere marginal connecting flange; said panel and its extension being covered by said fender and an integral one-piece extension of the latter; said fender extension having a width similar to that of and being arranged in closely spaced relation to said panel extension, said fender extension being removably fastened to said panel extension at points remote from the wheel housing proper.

3. In a vehicle body; a wheel housing and a fender near one end of the body; a panel constituting the skirt of the wheel housing; said panel having along its upper margin an integral one-piece portion which extends beyond the wheel housing proper toward the longitudinal middle plane of the body; said fender being correspondingly inwardly extended, said fender extension overlapping the inward extension of said panel; said fender being demountably attached to said panel extension at points inwardly spaced from the plane of the wheel housing skirt.

4. In a vehicle body; a wheel housing and a fender near one end of the body; a panel constituting the skirt and, in the region of the housing nearer the transverse middle plane of the body, part of the outwardly extending crown of the wheel housing; said panel having along its upper margin in the region nearer to the end of the body an integral one-piece portion which extends beyond the wheel housing proper toward the longitudinal middle plane of the body; said fender being inwardly extended in its end region so as to adapt it to overlap the inward extension of said panel; said fender being attached to said panel extension at points inwardly spaced from the plane of the wheel housing skirt and, in the region of the crown portion, to the body at points outwardly spaced from the aforesaid plane.

5. In a vehicle body; a longitudinal side sill member, a wheel housing and a fender; said sill member being in the region of the wheel housing substantially straight and extending generally parallel to the longitudinal middle line of the body; a panel forming the skirt of the wheel housing, this skirt being arranged in the general vertical plane defined by said sill member and having its lower marginal portion attached to the latter; said panel having in its upper region a portion which extends inwardly beyond the aforesaid vertical plane; said fender being similarly inwardly extended so as to overlap said panel extension; said panel and said fender being connected to each other by their extensions at points inwardly remote from the vertical plane of the sill member and the wheel housing skirt.

JOSEPH LEDWINKA.
GEORGE TRAUTVETTER.
JOHN W. KELLY.